United States Patent [19]

Mori et al.

[11] Patent Number: 4,791,677
[45] Date of Patent: Dec. 13, 1988

[54] IMAGE SIGNAL PROCESSOR

[75] Inventors: Toshiki Mori, Ibaraki; Haruyasu Yamada, Hirakata; Kunitoshi Aono, Hirakata; Masakatsu Maruyama, Hirakata, all of Japan

[73] Assignee: Matsushita Electric Industrial Co., Ltd., Osaka, Japan

[21] Appl. No.: 941,625

[22] Filed: Dec. 11, 1986

[30] Foreign Application Priority Data

Dec. 16, 1985 [JP] Japan ............................ 60-283308
Sep. 16, 1986 [JP] Japan ............................ 61-217446

[51] Int. Cl.⁴ .................. G06K 9/36; G06K 9/64; G06F 15/336
[52] U.S. Cl. ............................ 382/41; 382/42; 382/27; 382/49; 358/160; 358/166; 358/167; 358/284
[58] Field of Search ............... 382/41, 42, 49, 27; 358/160, 166, 167, 284

[56] References Cited

U.S. PATENT DOCUMENTS

| | | | |
|---|---|---|---|
| 4,484,346 | 11/1984 | Sternberg et al. | 382/41 |
| 4,550,437 | 10/1985 | Kobayashi et al. | 382/41 |
| 4,635,292 | 1/1987 | Mori et al. | 382/49 |
| 4,646,355 | 2/1987 | Petrick et al. | 382/49 |
| 4,718,091 | 1/1988 | Kobayashi et al. | 382/41 |

Primary Examiner—James J. Groody
Assistant Examiner—Michael D. Parker
Attorney, Agent, or Firm—Wenderoth, Lind & Ponack

[57] ABSTRACT

An image signal processor which includes a local image register for receiving local image area data of m rows×n columns pixels, and a expansion use register of m row×1 column pixels coupled to the output of the local image register. Thereby, expansion of local image area, and parallel processing can be readily conducted.

7 Claims, 9 Drawing Sheets

IMAGE SIGNAL PROCESSOR

BACKGROUND OF THE INVENTION

This invention relates to an image signal processor, and more particularly to an architecture of an image signal processor in which local image processing such as spatial convolution, non-linear neighbor arithmetic operations can be conducted at high speed and also, expansion of local image area and parallel processing by use of multi-processor can be readily conducted.

Generally speaking, image processing includes the following five steps which are sequentially conducted. That is, (i) observation, (ii) sampling/quantizing/coding, (iii) preprocessing, (iv) feature extraction, (v) object recognition. An object is observed by, generally, a video camera, whose image output is then digitized. In this case, the digitized image includes random noise due to camera characteristics and light reflection. Therefore, preprocessing is used to remove the unwanted noise component. After this processing, features are extracted from the preprocessed image signal and, thereafter, the extracted features are used to identify the object which was observed by a video camera.

In such image processing, the preprocessing consume the most time since it handles huge digital data which represents an image. Current Von Newman type computers are not good at such processing.

Then, several trials have been conducted to realize high-speed image signal processing by parallel-processing image signal data, but it is extremely difficult to parallel-processing whole data of a picture frame. Local parallel image processing, which handles local image data of m-by-n picture elements (pixels) of a picture frame, is applicable to wider processing such as averaging, differential operation, data transformation and so on, and size of circuitry therefor is relatively small. Therefore, development of LSI for use in such local parallel image processing is actively conducted.

A conventional local parallel processing type image signal processor has specific structure which is exclusively used for each image processing function and therefore, in general, does not have general purpose-use-structure and expansion function.

Generally speaking, a local image signal processor is one which picks up local image area data of certain proper size out of input image data, and which makes calculation to such local image area data. That is, a local image signal processor handles image processing of whole picture frame by scanning a window which simply covers a local image area over whole area of a picture frame.

Among image signal processings, there are many processings which are conducted by local processing such as averaging, differential operation, feature extraction and so on. These processings have different complexities one another according to configuration and size of local image area. Generally, such image processing is conducted to local area of approximately 3-by-3 through 16-by-16 pixels.

On example of conventional local image signal processor is disclosed in "Image signal processor computes fast enough for gray-scale video", Tadashi Fukushima, Electronic Design, Oct. 4, 1984, pages 209 through 215. The image signal processor disclosed in Electronic Design has specific exclusive use structure, but does not have general purpose use structure, and further, requires many peripheral/additional circuits to realize expansion processing.

SUMMARY OF THE INVENTION

The present invention, therefore, has as its principal object the provision of an improved image signal processor which particularly realizes expansion of local image area with high speed operation and has a simple architecture suitable for LSI.

This and other objects of the invention are accomplished by image processor according to the present invention, which processor includes a local image register for picking up local image area data of (m) rows×(n) columns, an expansion use register coupled to the local image register for delaying the output of (m) rows×1 column, and a calculation unit coupled to the local image register for conducting calculation based upon the local image area data. The calculation unit has an input terminal which receives external data.

In a specific embodiment, the local image register comprises (m×n) one-pixel shift registers m may be 3 and n may be 3. The expansion use register comprises m one-bit shift registers. In this case, m may be 3.

According to the present invention as described herein, the following benefits, among others, one obtained.

(1) It is possible to obtain an image signal processor which can realize high speed local image processing.

(2) It is possible to obtain an image signal processor which can readily realize expansion processing of local image area by extremely simple structure.

(3) It is possible to obtain an image signal processor which has general purpose use structure by program control.

While the novel features of the invention are set forth with particularly in the appended claims, the invention, both as to organization and contents, will be better understood and appreciated, along with other objects and features thereof, from the following detailed description taken in conjunction with the drawings.

DETAILED DESCRIPTION OF THE INVENTION

Figure 1:
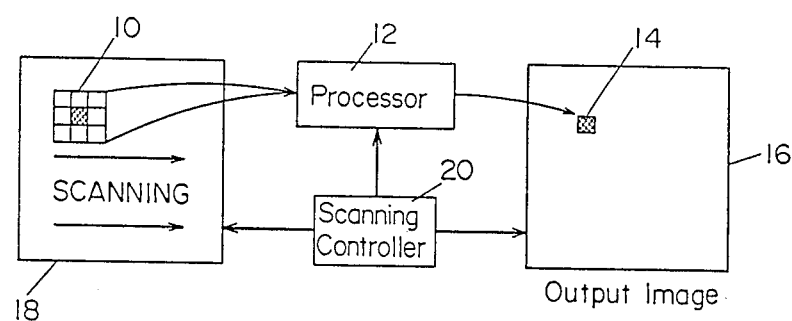
FIG. 1 shows a principle of local image processing on which the present invention is standing.

The invention is explained with reference to Figures. FIG. 1 illustrate a principle of local image processing.

Local image processing method is mostly applied to digital image processing systems such as edge detection, smoothing, etc. The data of each pixel and its neighboring pixels in the local window 10 are gathered and processed by processor 12 so that output pixel 14 of output image 16 is obtained, as shown in FIG. 1. The local window 10 scans sequentially over the frame picture of input image 18 one after the other, by scanning controller 20.

For the realtime image processing, a very high-speed processor is indispensable. In the case of the NTSC system with 512×512 pixels in one frame, sampling rate of image signals is about 90 nS per pixel. In this case the processor must complete the calculation of all the data of a local window within 90 nS. The local window generally covers 3×3 through 16×16 picture elements. The larger local window we choose, the higher processing speed we need.

The present invention is a simple but powerful realtime image signal processor.

Because of the development of the novel local image register and the pipeline register, the image signal processor of this invention can be operated in multi-chip mode in such image processing applications that require much higher speed of the enlarged local window. The speed can easily be increased to twice or more when two or more image signal processors are used, and simultaneously the local window can be enlarged without any time loss.

Figure 2:
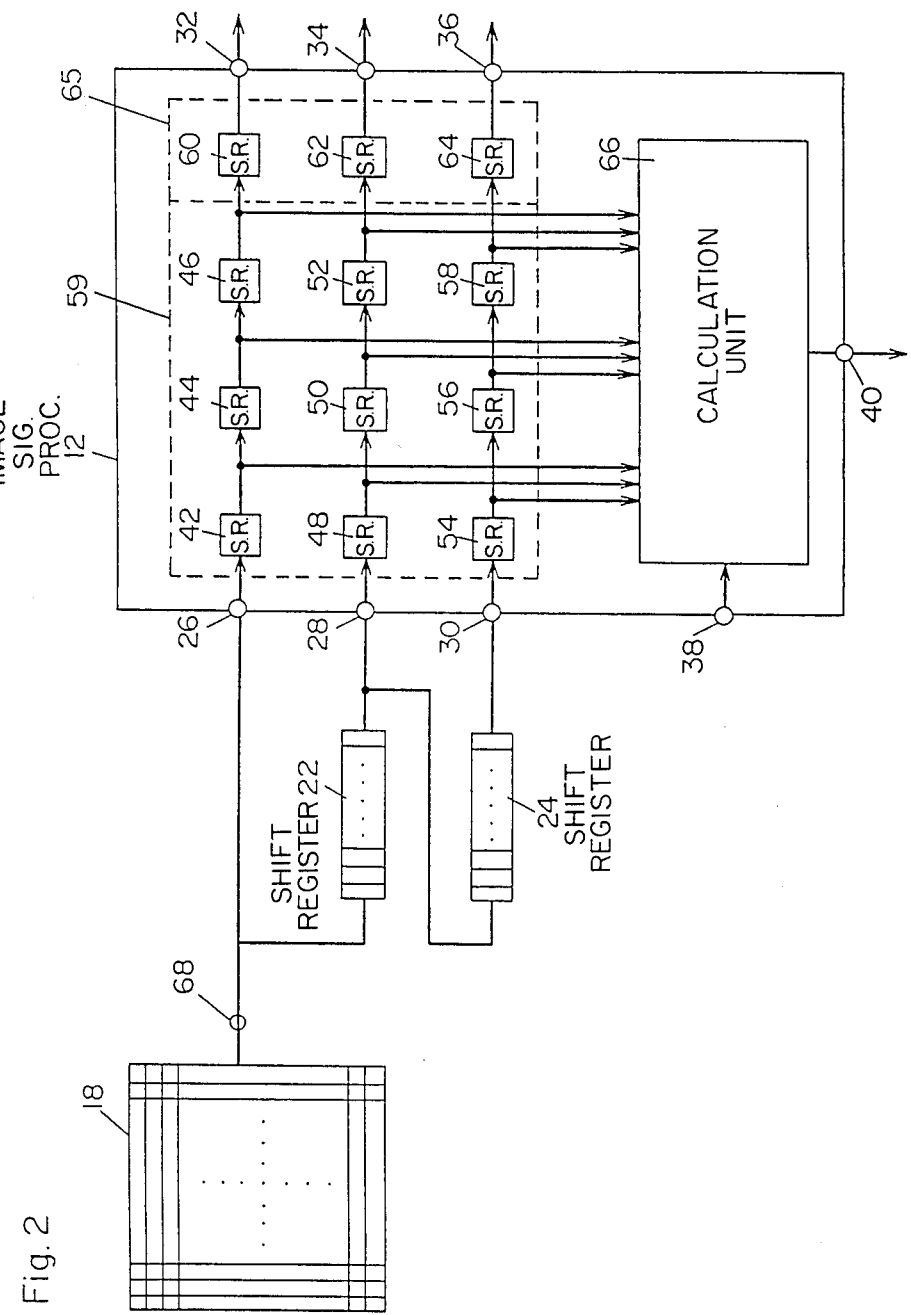
FIG. 2 is a block diagram of one embodiment of a local image processor according to the invention.

FIG. 2 shows one embodiment of a local image signal processor for handling local image are of 3-by-3 pixels or 3 rows×3 columns according to the invention. Input image signals 18 are applied, directly and indirectly through one line shift registers 22, 24, to local image signal processor 12 which has input terminals 26, 28, 30, output terminals 32, 34, 36, external data input terminal 38, and calculation result output terminal 40. One pixel shift registers 42~58 receive image data from terminals 26~36 and store local image data of (m) rows×(n) columns or (m)×(n) pixels. One pixel image data comprises 8 bits. Another one pixel shift registers 60~64 receive output from series-connected registers 42~46, 48~52, 54~58, respectively to produce outputs thereof to terminal 32~36. Outputs of shift registers 42~58 and external data from terminal 38 are applied to calculation unit 66 for calculation. Output of calculation unit 66 is applied to terminal 40.

Image data 18 are sequentially read out one pixel by one pixel by scanning of one input image, and applied to shift register 42. Shift register 40 receives data which is one-line-delayed data by one-line shift register 22 to the data which is applied to shift register 42. Shift register 54 receives data which is two-line-delayed data by one-line shift registers 22, 24 to the data which is applied to shift register 42. As stated above, three kinds of data, which are delayed by one line, respectively, are applied to shift registers 42, 48, 54 and then, transferred to shift registers 44, 50, 56 and 46, 52, 58 respectively so that image data are transferred one pixel by one pixel. By such operation, image data from input image are re-constructed by shift registers 42~58 as local image area data of 3-by-3 pixels or 3 rows×3 columns. These shift registers 42~58 are referred to as local image register 59. Local area data are processed by calculation unit 66 so that image processing of whole area is possible.

Shift registers 60, 62, 64 are referred to as expansion use register 65.

There is a relevant U.S. patent application, Ser. No. 682,321, now U.S. Pat. No. 4,615,292, filed Dec. 17, 1984 which includes similar circuit structure to FIG. 2 structure, but does not include expansion use register 65.

Figure 3:
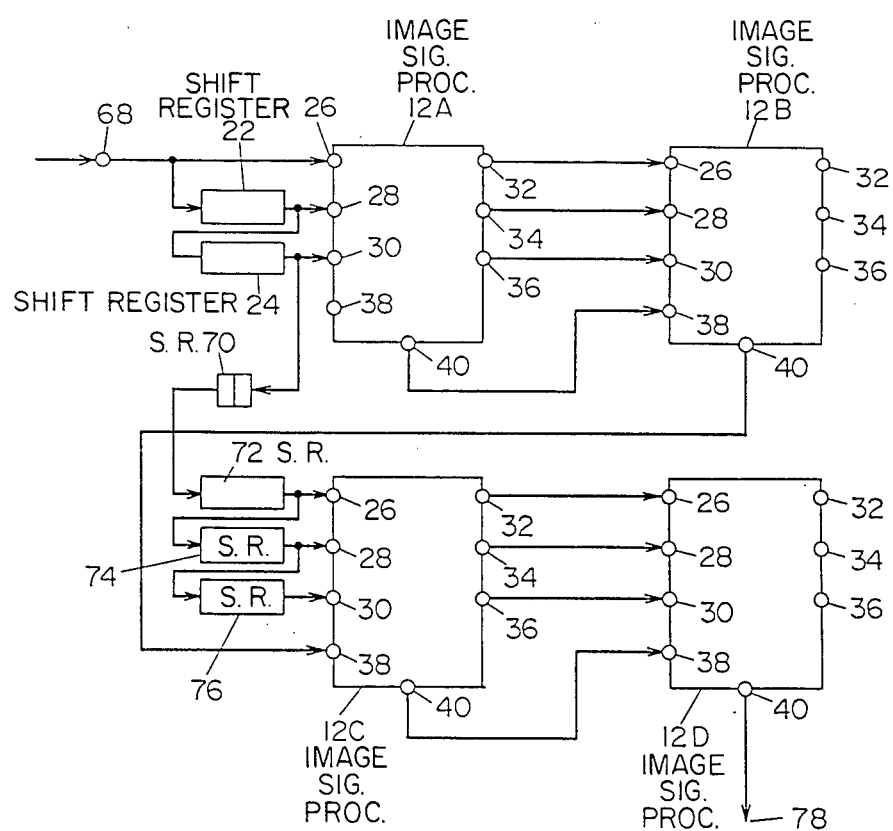
FIG. 3 is a block diagram of a local image processor as application of said one embodiment processor, which has local image area expansion function.

FIG. 3 shows a case in which image processing of expanded local area is conducted by use of a plurality of local image signal processors 12. In this FIG. 3 embodiment, expanded local image processing of 6-by-6 pixels or 6 rows×6 columns is possible by use of four processors 12A~12D of 3 rows×3 columns. Structure of each processor is the same as shown in FIG. 2.

Input image signal 18 is applied through image signal input terminal 68 to image signal processor 12A. The structure of processor 12A and its peripherals is the same as shown in FIG. 2. Output terminals 32, 34, 36, 40 of processor 12A are connected input terminals 26, 28, 30, 38 of processor 12B. The output terminal 40 of processor 12B is connected to external signal input terminal 38 of processor 12C. The output of one-line shift register 24 is applied through two pixels shift register 70, one-line shift register 72, to input terminal 26 of processor 12C. The output of one-line shift register 72 is applied through one-line shift register 74 to input terminal 28 of processor 12C. The output of one-line shift register 74 is applied through one-line shift register 76 to input terminal 30 of processor 12C. The output terminals 32, 34, 36, 40 of processor 12C are connected to input terminals 26, 28, 30, 38 of processor 12D, respectively. Final output 78 is produced from output terminal 40 of processor 12D.

Figure 4:
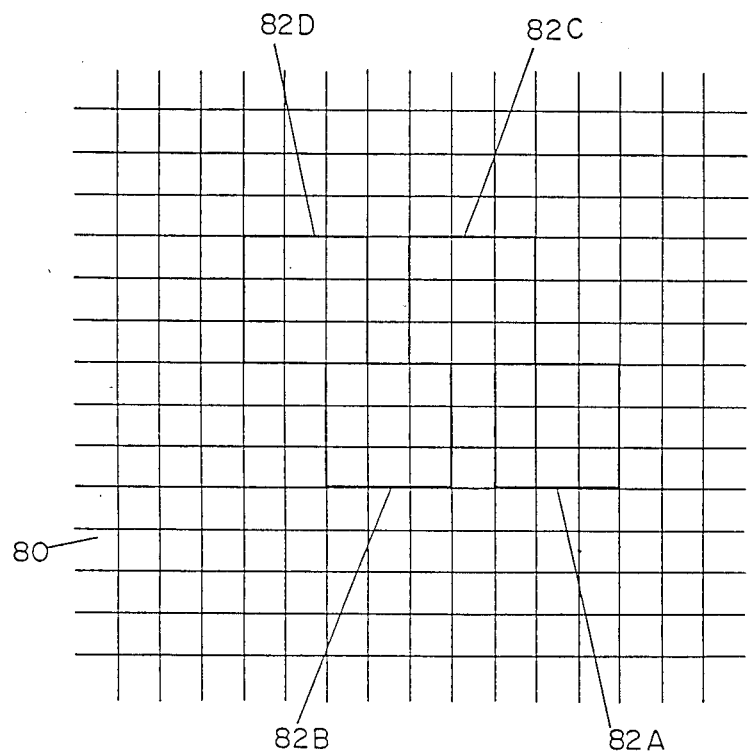
FIG. 4 shows operation of the local image processor shown in FIG. 3.

In FIG. 4, an image to be processed is designated by numeral 80. Local areas 82D~82A are supplied to and stored in local image signal processors 12A~12D simultaneously at an arbitrary timing. Local areas 82A, 82B have a space of one pixel there between in horizontal direction. Local areas 82C, 82D have a space of one pixel therebetween in horizontal direction. As shown in FIG. 3, calculation result output signals of processors 12A~12C are applied through output terminals 40 to external data input terminals 38 of next stage processors 12B~12D. Therefore, in case of spatial convolution calculation etc., convolution calculation result of certain stage processor is ANDed, at next timing, with convolution calculation result of next stage processor. By transferring calculation result of each processor to next stage processor in scanning direction, output 78 of final stage processor 12D becomes calculation result of expanded local area (in this case, 6 rows×6 columns). The number of bit for shift register 70 differs according to the number of local image signal processor to be used.

In FIG. 3 structure, four local image processors 12A~12D do not produce their outputs simultaneously. That is, outputs from terminals 32, 34, 36 of processor 12A are delayed by expansion use shift resistors 60, 62, 64 (see FIG. 2) by one pixel (one bit). The output from terminal 40 of processor 12A is also delayed by calculation operation of calculation unit 66. Therefore, the output from terminal 40 of processor 12B is delayed to the output from terminal 40 of processor 12A. Similarly, the output from terminal 40 of processor 12C is delayed to the output from terminal 40 of processor 12B, and the output from terminal 40 of processor 12D is delayed to the output from terminal 40 of processor 12C. As stated above, four outputs of processor 12A~12D are outputted at different timing. Therefore, for example, the output of processor 12A is ANDed with the outputs from local image register 59 (see FIG. 2) of processor 12B in calculation unit 66 of processor 12B. This means that there is no need to provide pheripheral circuit for local image processing.

As explained above, expansion processing of local area can be realized without external additional circuits by use of a plurality of image signal processors, each of which includes local area resistors of (m) rows×(n) columns and expansion use register of (m) rows×(n) column.

Figure 5:
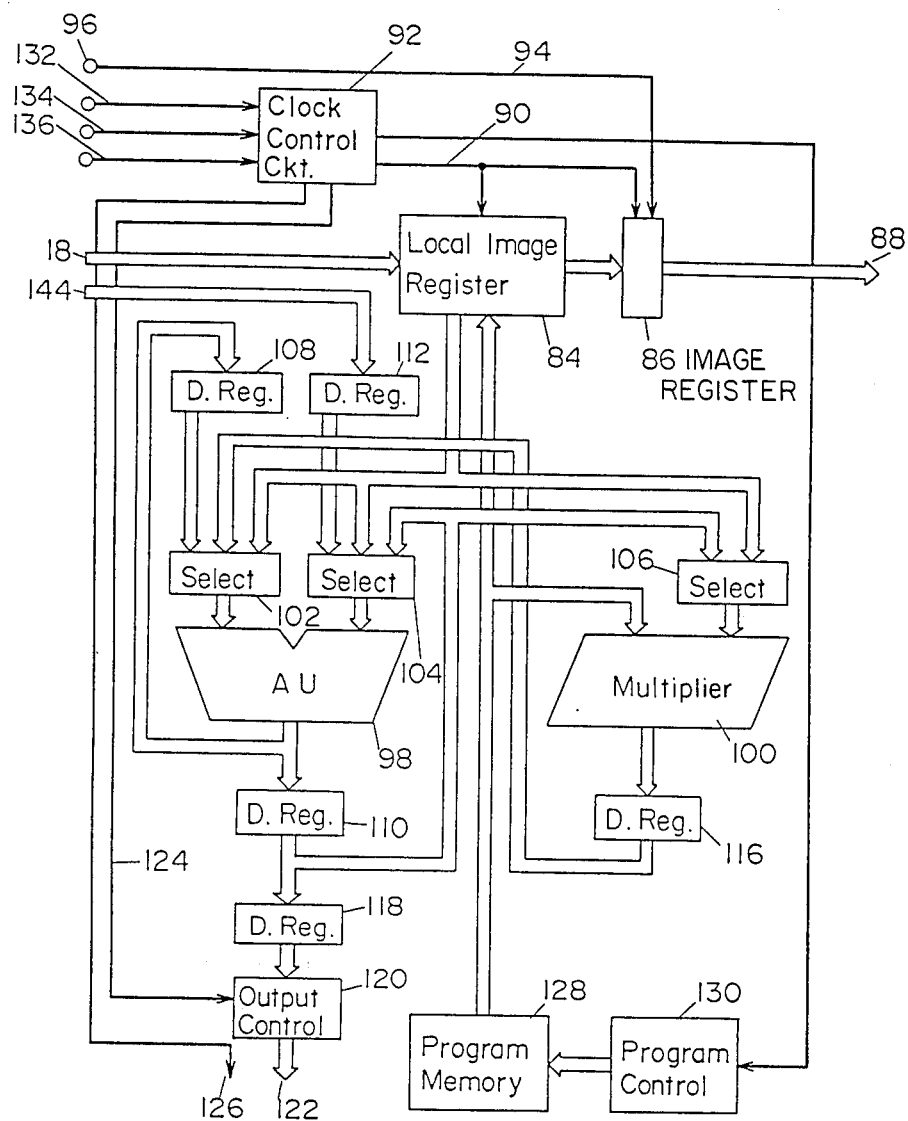
FIG. 5 is detailed block diagram of a local image processor of one embodiment.

FIG. 5 shows an example of an architecture of an image signal processor according to the present invention. Local image register 84, to which image data 18 is applied in parallel manner, stores local image area data of (m) rows×(n) columns. Expansion use image register 86 receives output signal of local image register 84, and shifts the image data in order, and produces image data output 88. The local image register 84 and expansion use image register 86 are driven by image read-in clock 90 from clock control circuit 92. The shift operation of expansion use image register 86 is controlled by expansion control signal 94 from input terminal 96. When the expansion control signal is supplied, the expansion use image register 86 is set in shift mode wherein expansion processing of local image are is conducted in pipe line manner. When the expansion control signal is not supplied, the expansion use image register 86 is set in pass mode or through mode wherein shift operation is not conducted. Arithmetic unit (adder and subtracter) 98 and multiplier 100 receive signals selected by selector 102, 104, 106 and conduct their calculation operations. Data register 108, 110 store calculation result of arithmetic unit 98. Data register 112 stores input data 114 from data input terminal. Data register 116 stores calculation result of multiplier 100. Data register 118 stores output data from data register 110. Output control circuit 120 allows to pass data signal output 122 therethough only during the specified duration according to control signal 124 from clock control circuit 92. Output clock 126, which is generated from clock control circuit 92, is used for having data signal output 122 read in external register (not shown). Program memory 128 stores image processing program. When image processing is conducted, the program is read out by program control circuit 130 and then, each block is controlled by such read-out program. Each block is operated by clock from clock control circuit 92. The clock control circuit 92 receives system clock 132, program start signal 134, parallel control signal 136 and produces the above-stated output clock 126 and control clock for each block.

It is possible to write in program memory 128 address signal for reading out data of arbitrary one pixel in local image register 84 which stores local area data of m rows×n columns, calculation control signal of arithmetic unit (adder and subtracter) 98, control signals for selectors 102, 104, 106, write-in control signals for registers 112, 110, 116, multiplifying numeral of multiplier 100 and so on. If these are combined to thereby prepare image processing program, arbitrary calculation to local image area data which are read in local image register 84 can be carried out at high speed.

As explained above, image processing program, which is written in program memory 128, is executed to one local image area data. The calculation result which is stored in register 110 is transferred to output register 118 and then, outputted through output control circuit 120 as data output signal 122. Then, new local image area data is read in local image register 84. By repeating such operations in order, local parallel image processing to whole image is conducted.

In case that FIG. 5 architecture is made as LSI, size of local image register 84 is limited to approximately $3\times3\sim5\times5$ from the view point of integration density. On the other hand, in case of local parallel processing of image, generally, local image register of approximately $3\times3\sim16\times16$ pixels is used. If an image signal processor having a local image register of $3\times3$ pixels is applied to local parallel processing which handles local image area of $12\times12$ pixels, complex external circuitry is required other than 16 image signal processors. In this invention, such external circuitry is not necessitated to conduct the above-stated processing.

Further, an image signal processor according to the invention has a structure which readily enables parallel processing by use of multi-processor. In case that local parallel processing is conducted during a given period and, processing speed is beyond performance of an image signal processor, parallel processing must be conducted by using a plurality of processors. In this case, generally, complex external circuitry is required, but, in this invention, parallel processing can be realized without external circuitry.

Figure 6:
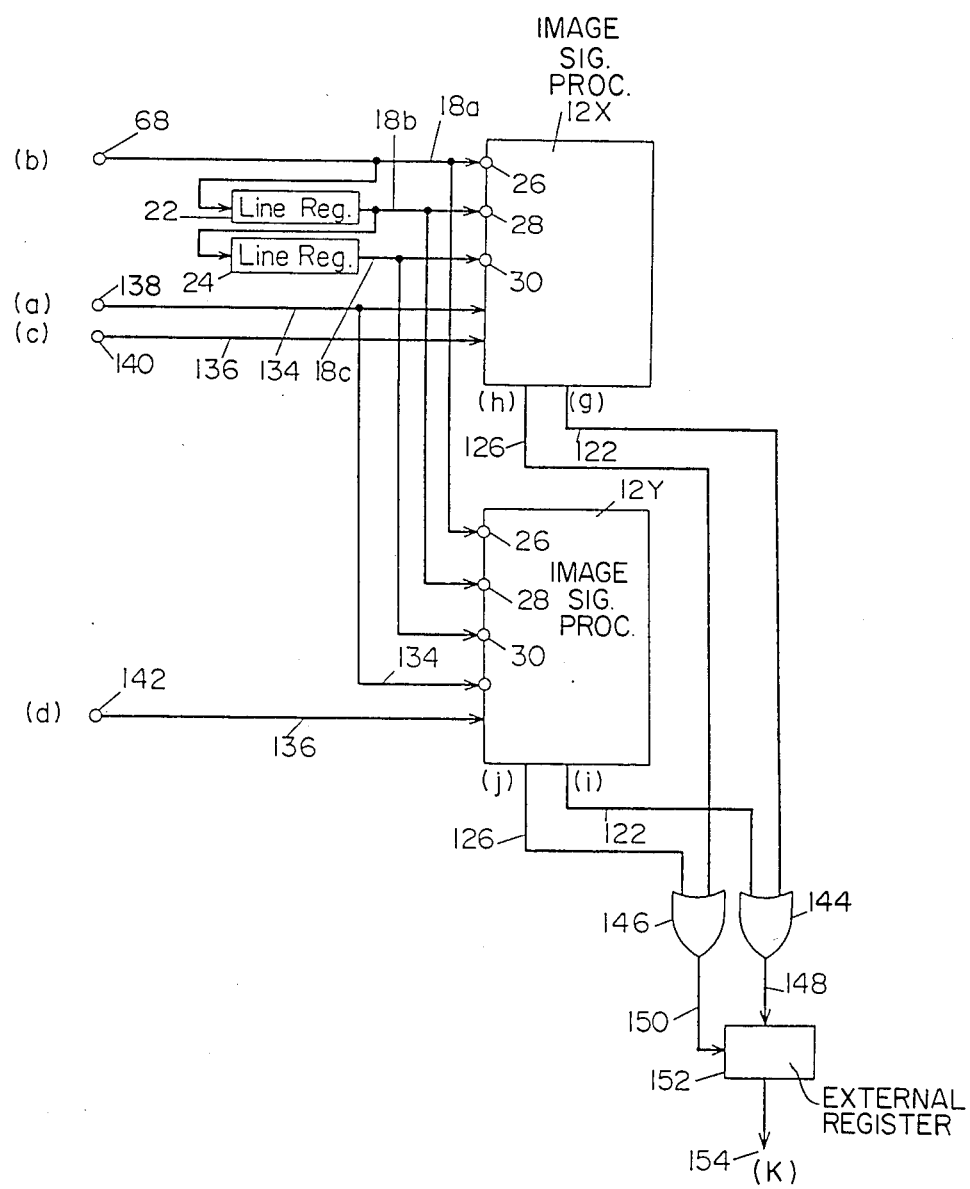
FIG. 6 is a block diagram of a local image processor as another application of the one embodiment processor.

FIG. 6 shows an example wherein parallel processing is conducted by using two image signal processors of the present invention. Image data from input terminal 68 is applied directly and indirectly through one-line register 22 and one-line registers 22, 24 to image signal processor 12X as input data $18a\sim18c$. Program start signal 134 from input terminal 138 and parallel control signal 136 from input terminal 140 are applied to image signal processor 12X. Image data $18a\sim18c$ and program start signal 134 are also applied to image signal processor 12Y. Parallel control signal 136 from input terminal 142 is also applied to image signal processor 12Y. The data outputs 122 of image signal processors 12X, 12Y are applied to OR gates 144, 146, respectively. These OR gates 144, 146 also receive output clocks 126 of image signal processors 12X, 12Y, respectively. The outputs 148, 150 of OR gates 144, 146 are applied to external register 152 which then produces output 154.

Each of the image signal processors 12X, 12Y includes local image register 84 of $3\times3$ pixels (see FIG. 5).

The image data input terminals of image signal processors 12X, 12Y receive image data of three lines simultaneously by use of one line registers 22, 24. Although same image data is applied to image signal processors 12X, 12Y, local image area data is read in each local image register 84 of each image signal processor 12X (12Y), one by one.

Figure 7:
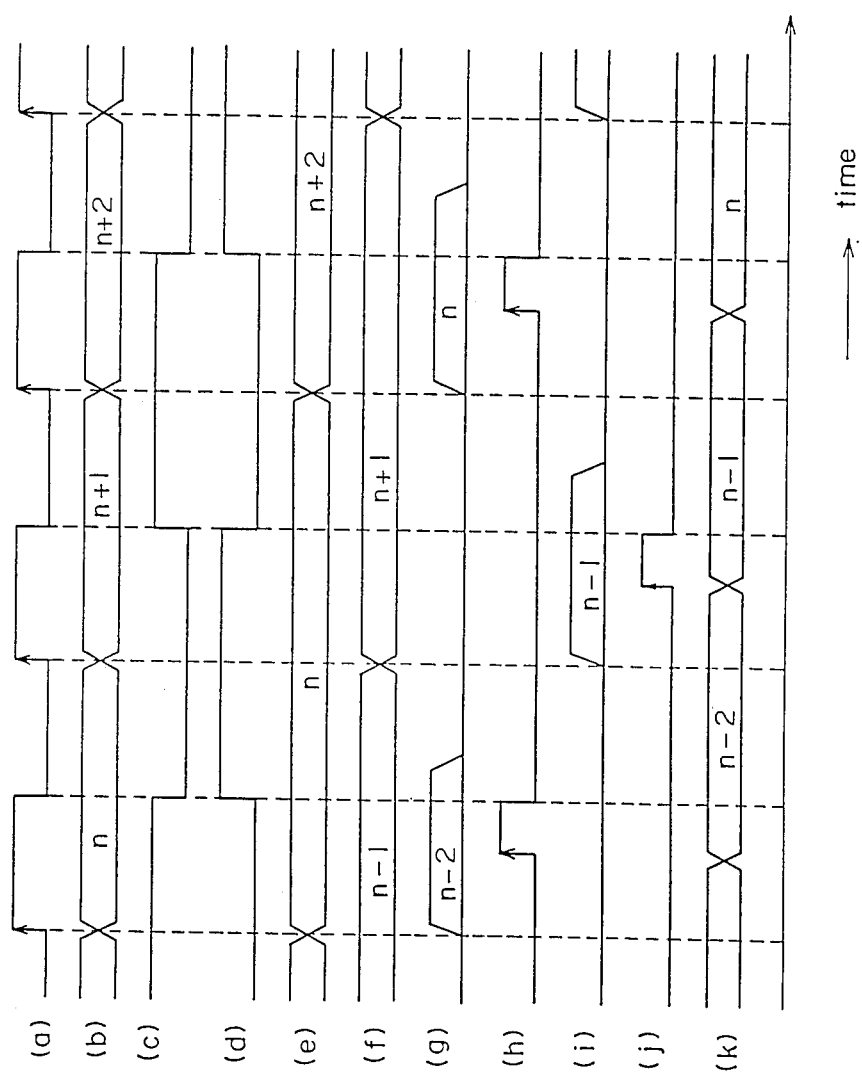
FIG. 7 is a timing chart for explaining the operation of the local image processor shown in FIG. 6.

FIG. 7 shows voltage wave forms of principal portions of FIG. 6 structure. In FIG. 7 (a) shows program start signal 134. The processing operation of image signal processors 12X, 12Y is initiated and read-in of image input data 18 [see, (b) of FIG. 7] to local image register 84 is initiated in synchronous with program start signal 134. (c), (d) show parallel control signals 136 to be applied to image signal processors 12X, 12Y. These two parallel control signals 136 are opposite in phase to each other. These parallel control signals 136 are applied to clock control circuits 92 of image signal processors 12X, 12Y, respectively and control reading clock of local image register 84, clocks for program start timing, output control circuit, external register. That is, image data read-in to local image register 84 is conducted are by one as shown in (e), (f). According to this, program of each processor 12X (12Y) is initiated one by one and executed so that calculation is carried out to read-in local image area data. The calculation result of each image signal processor is outputted one by one in synchronous with program completion. The data output is outputted for a given period by output control circuit 120 so that (g), (i) wave forms are obtained. Data output signals 122 are added by OR gate 144 (h), (j) show clocks 126 which are outputted from the image signal processors and used for read-in to external register 152. The clocks 126 are also added by OR gate 146. Added calculation result 148 and added clock 150 are applied to external register 152 to thereby produce processed data 154 which is consecutive. FIG. 7 (k) shows a signal 154 (see FIG. 6) which is output from the external register 152. In case that the image signal processor is formed by ECL gate, OR gate can be formed by wired OR which is constructed by simply wiring so that OR gates 144, 146 are not necessitated.

As explained above, parallel processing is possible by simple structure.

Figure 8:
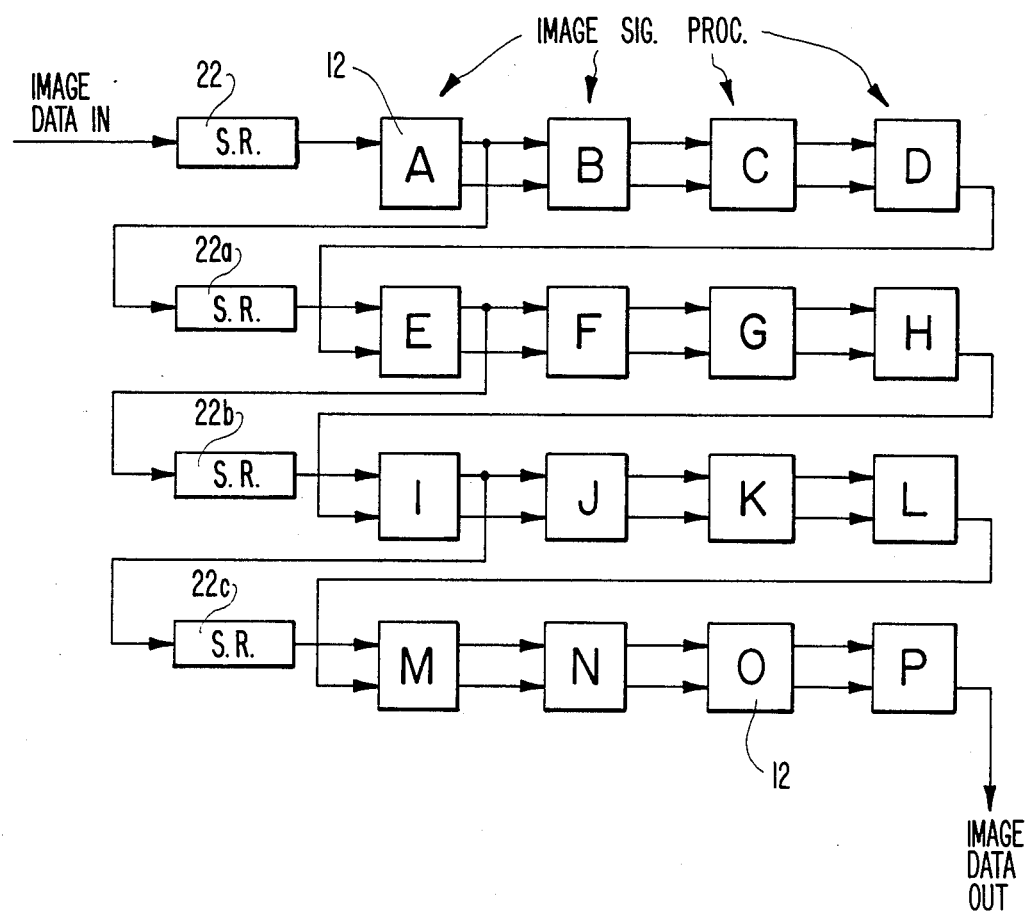
FIG. 8 is a block diagram of a local image processor as still further application of the one embodiment processor.
Figure 9:
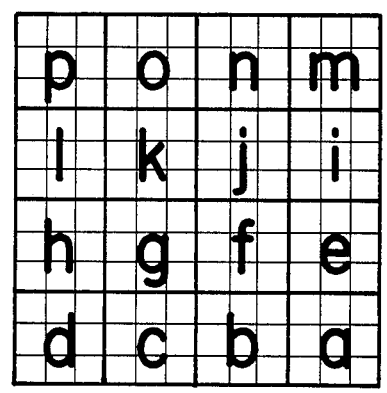
FIG. 9 shows operation of the local image processor shown in FIG. 8.
Figure 10:
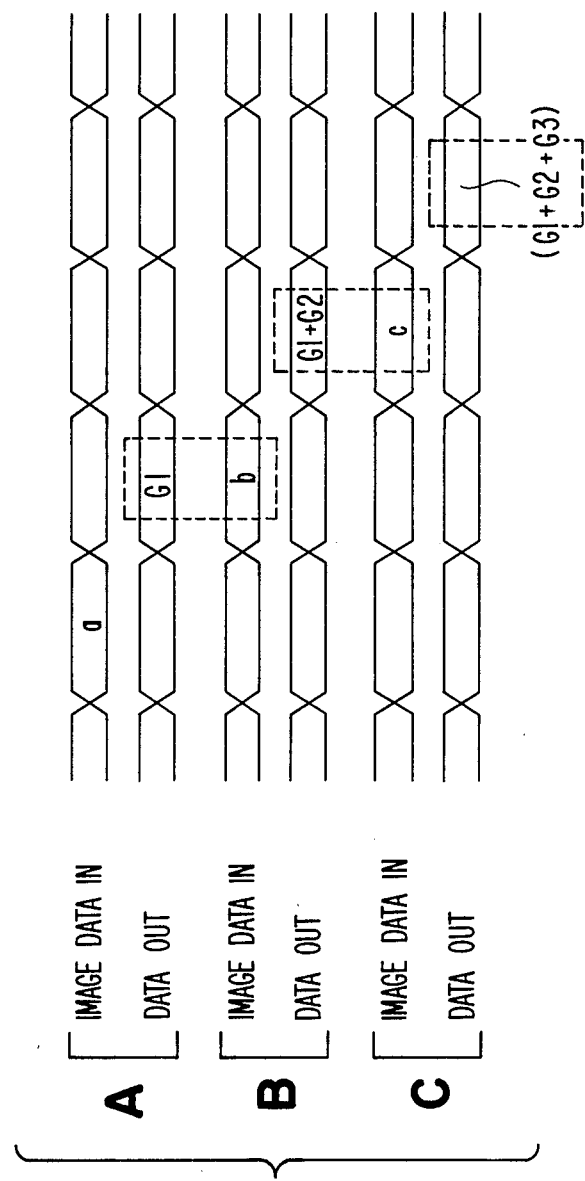
FIG. 10 is a timing chart for explaining the operation of the local image processor shown in FIG. 8.

FIG. 8 shows a local image processor as still further application. In some applications, there is a need to handle the data of an enlarged local window; for example, an array of 12×12 pixels as shown in FIG. 9. The processor can be used in this case, because of its novel pipeline architecture.

For instance, the spatial filter with the expanded local window of 12×12 pixels is $$G(X,Y) = \sum_{i=1}^{12} \sum_{j=1}^{12} Wij \cdot F(X + i, Y + j).$$

This convoluted equation is re-written down with sixteen partial convolutions as $$G(X,Y) = \sum_{i=1}^{3} \sum_{j=1}^{3} Wij \cdot F(X + i, Y + j) +$$
$$\sum_{i=4}^{6} \sum_{j=1}^{3} Wij \cdot F(X + i, Y + j) +$$
$$\ldots + \sum_{i=10}^{12} \sum_{j=10}^{12} Wij \cdot F(X + i, Y + j)$$
$$= G_1 + G_2 + G_3 + \ldots + G_{16}$$

where $$G_1 = \sum_{i=1}^{3} \sum_{j=1}^{3} Wij \cdot F(X + i, Y + j), \ldots, G_{16}$$
$$= \sum_{i=10}^{12} \sum_{j=10}^{12} Wij \cdot F(X + i, Y + j).$$

The enlarged local window is further divided into sub-windows-a, b, c, ... p. Each sub-window has a data size of 3×3, the same as the local-image register of the processor. Sixteen units A, B, C, ..., P process the sub-window data, one by one. As shown in FIG. 8, sixteen units are connected serially.

The unit A handles the image data of the sub-window-a, and calculates the partial convolution; $G_1$. The partial convolution; $G_1$ is taken out at the next clock cycle of an input timing of the image data. The image data through the local-image register are internally delayed by one clock cycle by the pipeline register, and are transferred to the next unit. Then the image data of sub-windows are taken in to each unit with shifting by one clock cycle each other. So the data of the partial convolution; $G_1$ and the image data of the sub-window-b are supplied to the unit B at the same timing. Then the unit B can simultaneously achieve the convolution of $G_2$ and the summation of $G_1$ and $G_2$. With the same method, the unit C achieves the convolution of $G_3$ and the summation of $(G_1+G_2)$ and $G_3$. The unit P achieves the convolution of $G_{16}$ and the summation of $(G_1+G_2+ \ldots +G_{15})$ and $G_{16}$. This data output from the unit P is just G (X, Y).

This pipelining technology makes it possible to expand the local window with no time loss nor the use of any other processing unit. Pipelining and the parallelism of the processor can be utilized simultaneously.

While specific embodiments of the invention have been illustrated and described herein, it is realized that other modifications and changes will occur to those skilled in the art. It is therefore to be understood that appended claims are intended to cover all modifications and changes as fall within the true spirit and scope of the invention.

What we claim is:

1. An image signal processor comprising:
   a local image register for picking up local image area data of (m) rows×(n) columns;
   an expansion use register coupled to the output of said local image register for delaying the output of (m) rows×1 column; and
   a calculation unit coupled to said local image register for conducting calculation based upon said local image area data, said calculation unit having an input terminal which receives external data.

2. The image signal processor of claim 1, wherein said local image register comprises (m×n) one-pixel shift registers.

3. The image signal processor of claim 2, wherein m is 3 and n is 3.

4. The image signal processor of claim 1, wherein said expansion use register comprises m one-pixel shift registers.

5. The image signal processor of claim 4, wherein m is 3.

6. An image signal processor comprising:
   at least first and second local image processors,
   each of said local image processors including a local image register, an expansion use register coupled to said local image register and a calculation unit coupled to said local image register,
   said first local image processor being designed to receive image data, which data is applied to said local image register,
   said second local image processor being designed to receive outputs of said expansion use register and calculation unit of said first local image processor, said output of the expansion use register being applied to said local image register of said second local image processor and said output of the calculation unit of the first local image processor being applied to the calculation unit of the second local image processor,
   whereby the output of the calculation unit of the first local image processor and the output of the local image register of the second local image processor are applied to and calculated by the calculation unit of the second local image processor.

7. An image signal processor comprising:

a local image register for picking up local image area data of (m) rows×(n) columns;

an expansion use register coupled to the output of said local image register for delaying the output of (m) rows×1 column;

an arithmetic unit for conducting calculation of addition and subtraction based upon said local image area data;

a clock control circuit coupled to said local image register and expansion use register for supplying clock signals thereto;

a register coupled to said arithmetic unit for storing the output of said arthmetic unit;

a selection circuit coupled to said arithmetic unit for selecting the input of said arithmetic unit; and an output control circuit coupled to said register which stores the output of said arithmetic unit for passing the output of the arithmetic unit therethrough for a predetermined period, said period being determined by said clock control circuit.

* * * * *